US012589052B1

(12) United States Patent
Kaykov

(10) Patent No.: US 12,589,052 B1
(45) Date of Patent: Mar. 31, 2026

(54) BABY BOTTLE FIXER

(71) Applicant: Lina Kaykov, Coral Springs, FL (US)

(72) Inventor: Lina Kaykov, Coral Springs, FL (US)

( * ) Notice: Subject to any disclaimer, the term of this patent is extended or adjusted under 35 U.S.C. 154(b) by 0 days.

(21) Appl. No.: 18/514,051

(22) Filed: Nov. 20, 2023

(51) Int. Cl.
*A45F 5/00* (2006.01)
*A61J 9/06* (2006.01)

(52) U.S. Cl.
CPC .................................. *A61J 9/0661* (2015.05)

(58) Field of Classification Search
CPC .................................................... A61J 9/0661
See application file for complete search history.

(56) References Cited

U.S. PATENT DOCUMENTS

| | | | | | |
|---|---|---|---|---|---|
| 2,994,300 | A * | 8/1961 | Grahling | A01K 27/005 | 119/770 |
| 3,152,738 | A * | 10/1964 | Worsfold, Jr. | A45F 5/00 | 224/259 |
| 4,253,544 | A * | 3/1981 | Dalmaso | A62B 35/04 | 182/18 |
| 4,254,901 | A * | 3/1981 | McIntosh | G10G 5/005 | 224/259 |
| 4,765,279 | A * | 8/1988 | Klickstein | A01K 27/003 | D29/100 |
| 5,483,860 | A * | 1/1996 | Adams | G10G 5/005 | 224/272 |
| 5,664,712 | A * | 9/1997 | Smrt | A45F 5/02 | 224/904 |
| 6,978,918 | B2 * | 12/2005 | Scanlan | A61J 9/06 | 224/563 |
| 7,204,468 | B2 * | 4/2007 | Kintzele | F16G 11/14 | 248/102 |
| 7,467,604 | B1 * | 12/2008 | Werner | A01K 27/005 | 119/770 |
| D597,788 | S * | 8/2009 | Ellis | D7/387 | |
| D625,425 | S * | 10/2010 | Williams | D9/434 | |
| D701,966 | S * | 4/2014 | Owada | D24/199 | |
| 9,055,797 | B2 * | 6/2015 | Dycus | A45C 11/00 | |
| 11,191,381 | B2 * | 12/2021 | Fynbo | A47G 23/0306 | |
| 11,528,985 | B2 * | 12/2022 | Preston | A45F 3/14 | |
| D1,007,248 | S * | 12/2023 | Jin | D3/202 | |
| 2007/0252048 | A1 * | 11/2007 | Ivie | A61J 9/06 | 248/104 |
| 2008/0149672 | A1 * | 6/2008 | Frauhiger | A61J 9/06 | 224/148.6 |
| 2008/0296325 | A1 * | 12/2008 | Tepper | A45F 5/00 | 224/148.6 |

* cited by examiner

*Primary Examiner* — Amy J. Sterling

(57) ABSTRACT

The Baby Bottle Fixer for uninterrupted sleep during napping. Crafted from versatile fabric, the baby bottle fixer has a fastener in the form of a Velcro fastening system, which ensures reliable fixation of the bottle. The belt boasts adjustable Velcro, on both the left and right sides, as well as a stretchable middle part. It also includes a Velcro, hook and loop fastener, in the middle for a bottle security. Adjusting the length of the belt is simple, allowing customization according to individual preferences and ensuring the desired distance from the baby's face or chest is achieved. The Velcro, hook and loop fastener, fastening system guarantees a secure hold, preventing any slipping or accidental dropping of the bottle. This clever design also allows for comfortable positioning in front of the baby's face or chest by regulating the length and tension.

8 Claims, 3 Drawing Sheets

BABY BOTTLE FIXER

BACKGROUND OF THE INVENTION

The present invention pertains to safety stroller accessories used for positioning a bottle support within the category of bottle support devices. The main function is to safely ensure an uninterrupted sleep during napping. Specifically, it offers a safety adjustment mechanism for controlling the feeding distance and tension, aiming to achieve optimal positioning that enhances the baby's comfort and convenience during feeding sessions in strollers or car seats. This feature ensures proper placement and stability of the bottle to provide a secure and enjoyable feeding experience for the baby.

It is difficult to ensure that the baby has an uninterrupted sleep at all times while napping and during napping self-feeding within reach once the baby wakes up and needs to get back to sleep, or often struggle to hold onto a bottle securely while falling asleep or waking up. Additionally, parents find it challenging to continuously hold the baby and make sure the bottle is accessible as the baby may wake up suddenly. It is essential for the baby to have uninterrupted sleep for their health and well-being. Finding a practical solution to securely position the bottle in front of the baby's face or chest is crucial. For instance, a solution that allows the baby to easily access and self-feed from the bottle even when drifting off to sleep. Furthermore, parents no longer need to worry about holding the baby constantly while they fall asleep or wake up during napping since the bottle is conveniently within a desirable reach.

Furthermore, the baby bottle fixer is ideal for stroller naps, ensuring that the baby has access to the bottle at all times. Its adjustable design allows for different distances and side placement, making it versatile and suitable for any desired preference.

Overall, the baby bottle fixer aims to enhance the feeding experience and provide convenience for both babies and parents during sleep and nap times, in a safe and practical manner.

Various baby bottle support devices have been disclosed in the known art, including those that have been patented and published in patent application publications. These devices mainly focus on bottle support and involve inventions such as nursing bottle supports, baby bottle holders, bottle holders specifically designed for babies, baskets for holding baby bottles.

These known devices don't consider safety aspects related to the baby's sleep patterns. These devices mainly focus on the fixed firm stretched bottle support within the frame which doesn't have elasticity to ensure the tension of the belt to automatically adjust the distance between the bottle and the baby's face ensuring optimal safety and comfort. These known devices fail to address the need to adjust the distance between the bottle and the baby's face as they fall asleep and wake up.

Additionally, the tension of the belt or strap used to secure the bottle support device should also be taken into account. It is crucial to have an adjustable tension and bouncing mechanism that provides a secure hold on the bottle while also allowing for flexibility and comfort for the baby. This ensures that the bottle remains in place without causing any unnecessary pressure or discomfort on the baby's face or body. By considering and incorporating these safety features, the overall design of the baby bottle fixer device can be improved to provide a safer and more convenient experience for both the baby and the caregiver.

Considering the devices disclosed in the known art, it is apparent that the present invention significantly differs in terms of safety features and design elements which ensures the most important feature-sleeping pattern. Therefore, it is evident that there is a demand for an enhancement to existing bottle support devices. In this context, the current invention satisfactorily addresses these needs by offering substantial improvements and fully generate a new type of accessory.

SUMMARY OF THE INVENTION

Considering the drawbacks inherent in the current types of bottle support devices available in the market, the present invention offers a new solution: a baby bottle fixer. This innovative belt accessory allows users to conveniently safely provide uninterrupted napping and bottle feed their babies on their own, falling asleep and getting back the bottle to the mouth once woken up, adjust the distance from the face to the bottle and keep the bottle providing them with safe increased ease and convenience compared to existing options in the known art.

The objective of the present invention is to introduce a superior safety baby bottle fixer that encompasses all the advantages found in prior art while eliminating any associated drawbacks. In doing so, this invention aims to offer an improved solution that surpasses the limitations of existing devices in the known art.

The baby bottle fixer is designed with an "x" shaped belt consisting of two shorter ends and two longer ends connected by a stretchy middle part. Each of the longer ends bends and forms a channel for attachment to a stroller or a car seat, while the channels can be of different diameters to provide easy and removable attachment to the frame of the stroller or a car seat and to control the length. The first shorter end and second shorter ends form a channel specifically designed to securely hold a bottle, with the channel configured to accommodate the bottle itself.

To ensure the bottle remains securely in place, Velcro system is attached at the shorter ends of the accessory. On one shorter end hook fastener, on another shorter end loop fastener. Velcro system, hook and loop fastener, can be fastened around the bottle, providing a firm grip and preventing the bottle from slipping or falling out during use.

An additional objective of the present invention is to offer a baby bottle fixer that can be easily manufactured at home using cost-effective materials, while ensuring durability. This ensures that the accessory is not only affordable but also capable of withstanding regular and prolonged use.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF INVENTION

Figure 1:
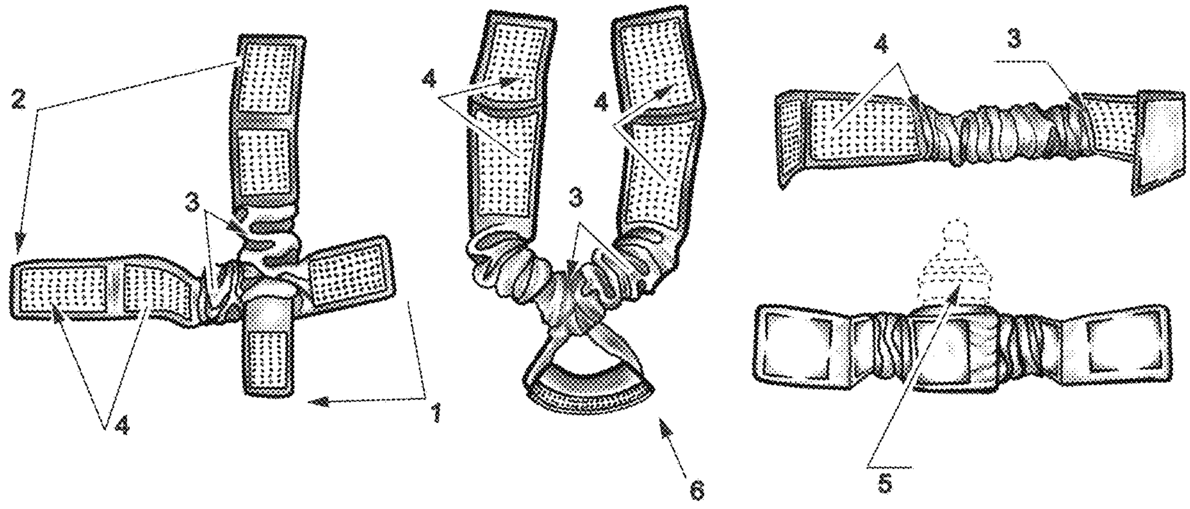
FIG. 1 shows a perspective view of the baby bottle fixer, wherein the belt is in an open position; perspective view of the ends; and having the attachable component; in an attached position

The following description relates to the invention of the baby bottle fixer. Throughout the accompanying drawings, reference numerals are used to illustrate similar or identical elements of the baby bottle fixer. It is important to note that the presented embodiment, which involves feeding a baby in a horizontal position using the baby bottle fixer, is discussed for the purpose of clarity. The figures provided are intended to be illustrative and should not be considered as restrictive in any way.

Referring now to FIG. 1, there is shown a perspective view of the baby bottle fixer, wherein the belt is in an open position in an "X" shape. The baby bottle fixer belt accessory is designed with an "X" shaped belt consisting of two shorter ends (1) and two longer ends (2) connected by a stretchy middle part (3). The stretchy middle part (3) can include an elastic band.

Both of the longer ends (2) in the presented version have a Velcro system (4), hook and loop fastener placed one after the other.

The two shorter ends (1) have a Velcro system, on one shorter end hook fastener, on another shorter end loop fastener, form a channel (6) to accommodate the bottle (5). The channel (6) ensures reliable holding the bottle (5).

All four ends have a rectangular perimeter, providing a safer design. However, in other embodiments, the ends of the "X" shaped belt can have any suitable shape and can be configured as an oval, square, or rectangle.

To ensure the bottle remains securely in place, Velcro system, hook and loop fastener, is attached at all ends of the baby bottle fixer accessory. The Velcro system, can be fastened around the bottle (5), providing a firm grip and preventing the bottle from slipping or falling out during use. However, in other embodiments, the ends of the "X" shaped belt can use any other system to create channels of different diameters to securely hold the bottle or attach to stroller bars, allowing for adjustable channel diameters. The "X" shaped belt is constructed of a forgiving material, such as 100% cotton, which will be soft to the touch. In alternative embodiments, the belt can be made of elastic and belt includes fabric that can be removably secured using fasteners, such as snaps, zippers.

Figure 2:
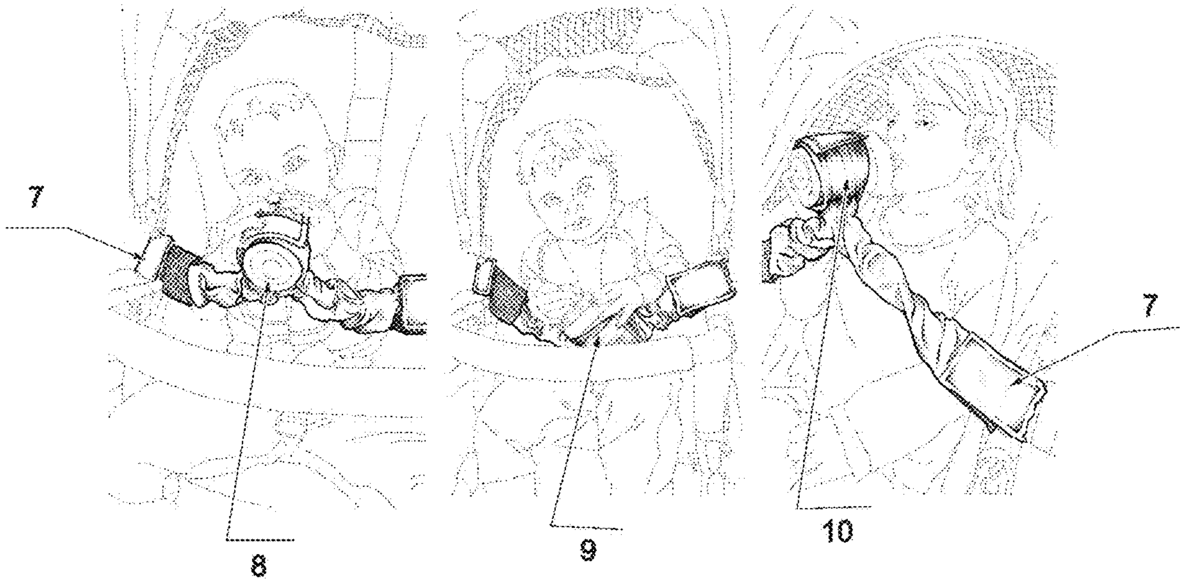
FIG. 2 shows the flexibility of the baby bottle fixer belt in accommodating different positions of the bottle relative to the face and size of the baby while being secured to a stroller.
Figure 3:
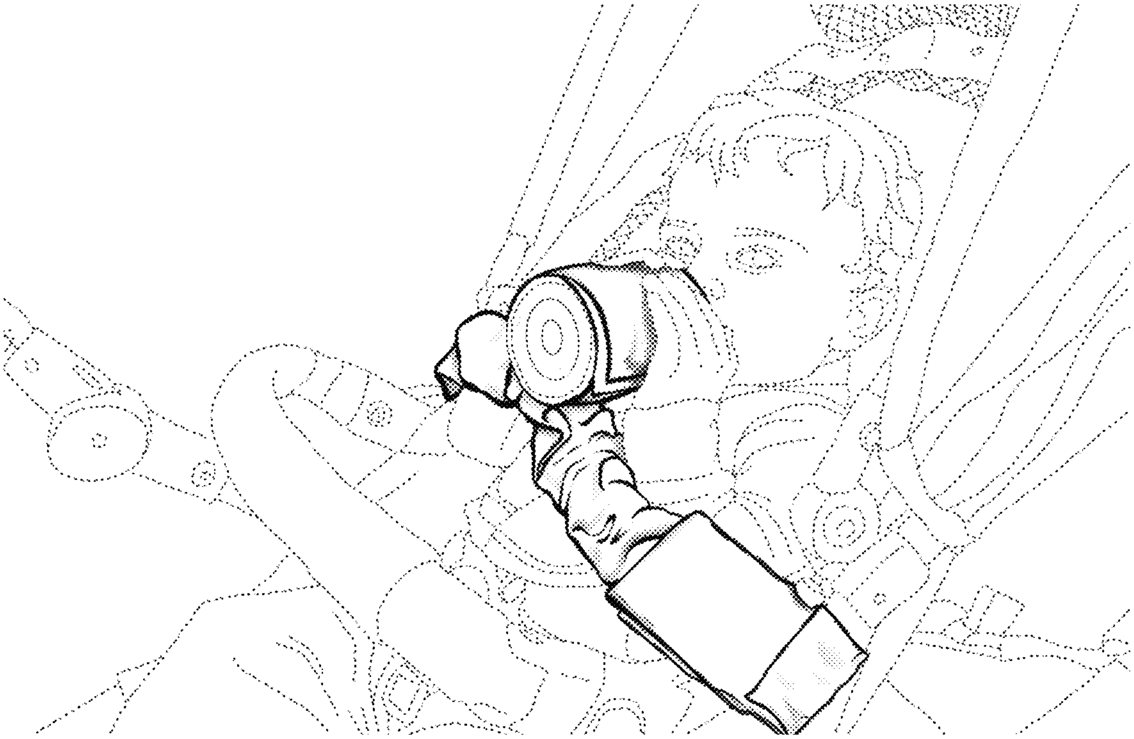

Referring now to FIG. 2, a perspective views of the baby bottle fixer are shown. The baby bottle fixer is securely attached to the stroller bars or carrier, holding the bottle in place. When in operation, the belt is positioned on or above the torso of a child, providing easy access to the mouth of the bottle. In this illustrated embodiment, the channels (7) are positioned around the stroller, creating a removably secured loop using a Velcro system. The channels can have different diameters to allow for easy and removable attachment to the stroller frame and control the length. The belt can be adjusted to accommodate different bottle sizes.

In alternative embodiments, the baby bottle fixer can also be positioned around other objects where the baby is placed, such as a baby carrier or car seat.

FIG. 2 depicts the flexibility of the baby bottle fixer belt in accommodating different positions of the bottle relative to the face and size of the baby. From normal position (8) of the belt, allowing the baby to hold the bottle while comfortably resting or sleeping. To where the belt is pushed down (9) to a lower position, providing additional support and preventing the bottle from being too close to the baby's face. Finally, when the belt is at its maximum stretch (10), ensuring a secure hold of the bottle while the baby naps with the bottle in their mouth. This angle allows the user to continually drink from the bottle comfortably.

Therefore, it is asserted that the present invention has been demonstrated and described in the most practical and preferred embodiments. However, it is acknowledged that variations and modifications may be made within the scope of the invention, and that those skilled in the art will recognize these obvious alterations. It should be understood that the optimal dimensional relationships for the various parts of the invention, including variations in size, materials, shape, form, function, assembly, and use, are readily apparent and apparent to those skilled in the art. Additionally, all equivalent relationships to those depicted in the drawings and described in the specification are intended to be encompassed by the present invention.

Therefore, the foregoing is considered illustrative only of the principles of the invention. Additionally, since numerous modifications and changes will readily occur to those skilled in the art, it is not desired to limit the invention to the exact construction and operation shown and described. Thus, all suitable modifications and equivalents within the scope of the invention may be utilized.

I claim:

1. A baby bottle fixer consisting of:

An "x" shaped symmetric fixer with two longer panels and two shorter panels equipped with a hook and loop system and an elastic part on each panel which is symmetrical about the fixed joint in the middle of the longer panels;

The shorter central symmetric panels combined together create a channel designed to hold a bottle;

Each of the two longer central symmetric panels creates two symmetric channels at the end to secure around stroller bars or a car seat to position the central shorter panels in the middle of the stroller bars.

2. The baby bottle fixer of claim 1, wherein the channel tapers from the first panel of the fixer to the second panel positioning the central shorter panels in the middle of the stroller.

3. The baby bottle fixer of claim 1, wherein the baby bottle fixer always has a fixed horizontal line configuration.

4. The baby bottle fixer of claim 1, wherein the second panel of the fixer includes a pair of apertures for removable attachment to a pair of protrusions located on the second panel.

5. The baby bottle fixer of claim 4, wherein the pair of apertures can be accessed via the hook and loop system.

6. The baby bottle fixer of claim 1, wherein the pair of distal panels of the fixer include a hook and loop system, allowing the symmetric fixer with a channel in the middle to form two loops.

7. The baby bottle fixer of claim 1, wherein all attachable components can be removably secured to the bars or bottle using hook and loop system.

8. The baby bottle fixer of claim 1, wherein a central fabric portion of longer panels contains an elastic part on each panel, which is symmetrical about the fixed joint to provide maximum stretch for movements of uninterrupted napping.

* * * * *